United States Patent [19]
Maas et al.

[11] Patent Number: 5,378,055
[45] Date of Patent: Jan. 3, 1995

[54] HYDRAULIC BRAKE SYSTEM WITH ANTI-LOCK CONTROL

[75] Inventors: Joachim Maas, Bad Vilbel; Klaus Michaelis, Waechtersbach, both of Germany

[73] Assignee: Alfred Teves GmbH, Frankfurt am Main, Germany

[21] Appl. No.: 241,064

[22] Filed: May 11, 1994

Related U.S. Application Data

[63] Continuation of Ser. No. 934,756, filed as PCT/EP92/00135, Jan. 23, 1992, abandoned.

[30] Foreign Application Priority Data

Feb. 12, 1991 [DE] Germany ............... 4104144

[51] Int. Cl.⁶ .................. B60T 8/32; B60T 8/48
[52] U.S. Cl. .................. 303/113.1; 303/115.4; 303/116.1
[58] Field of Search ........... 303/113.1, 113.2, 115.1, 303/115.4, 116.1, 116.2, 119.1, 901, DIG. 1-4, 117.1

[56] References Cited

U.S. PATENT DOCUMENTS

| | | | |
|---|---|---|---|
| 4,618,189 | 10/1986 | Nakanishi et al. | 303/116.1 |
| 4,708,407 | 11/1987 | Maehara | 303/115.4 |
| 4,964,681 | 10/1990 | Burgdorf et al. | 303/115.4 |

FOREIGN PATENT DOCUMENTS

| | | |
|---|---|---|
| 0043686 | 1/1982 | European Pat. Off. . |
| 3934624 | 4/1991 | Germany . |
| 60-71360 | 4/1985 | Japan ............... 303/115.4 |
| 2109069 | 5/1983 | United Kingdom . |
| 2126673 | 3/1984 | United Kingdom . |
| 2183763 | 6/1987 | United Kingdom . |

*Primary Examiner*—Robert J. Oberleitner
*Assistant Examiner*—Peter M. Poon
*Attorney, Agent, or Firm*—Robert P. Seitter; J. Gordon Lewis

[57] ABSTRACT

A hydraulic brake system with anti-lock control, in particular for automotive vehicles, comprising a braking pressure generator (18), at least one wheel brake (5), an auxiliary-pressure pump (1), a low-pressure accumulator (22), and a shut-off valve and outlet valve (12, 7) for controlling the braking pressure. The shut-off valve is controlled to permit or prevent pressure fluid flow between the braking pressure generator and the wheel brake by a stepped piston positioned in a stepped bore in a housing. Initially, the stepped-piston maintains the shut-off valve open to permit pressure fluid flow. During slip control operation when pressure fluid from the low-pressure accumulator is delivered to the stepped-bore by the auxiliary-pressure pump, the stepped-piston closes the shut-off valve to prevent pressure fluid flow.

13 Claims, 1 Drawing Sheet

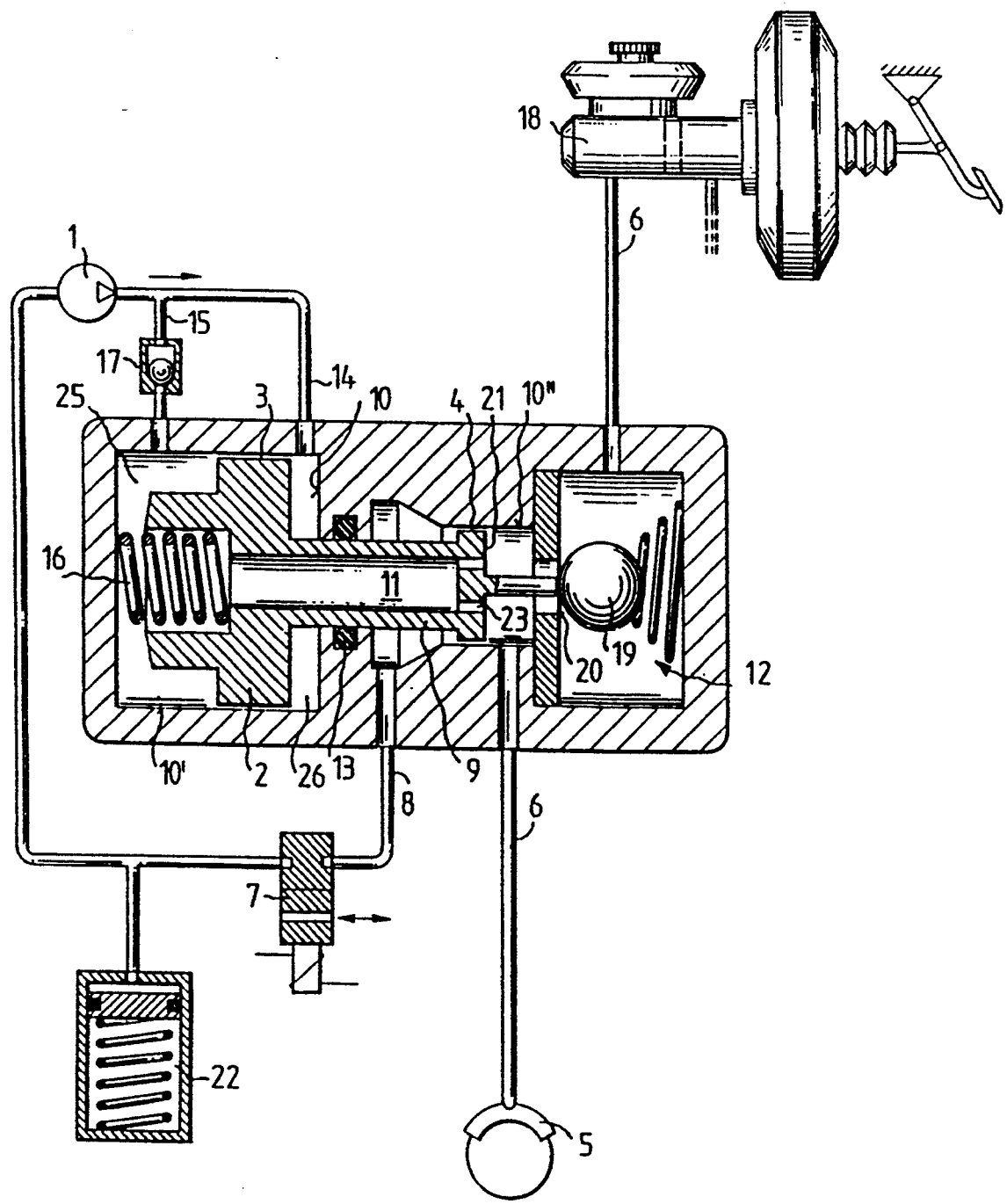

HYDRAULIC BRAKE SYSTEM WITH ANTI-LOCK CONTROL

This application is a continuation of application Ser. No. 07/934,756 filed as PCT/EP92/00135, Jan. 23, 1992, now abandoned.

BACKGROUND OF THE INVENTION

The present invention relates to a hydraulic brake system with anti-lock control, in particular for automotive vehicles.

A brake system of this type has been described in German patent application P 39 34 624. This system is known as a "closed-loop" ABS-system wherein, in contrast to the known "open-center" ABS-system, the auxiliary-pressure and return delivery system is not in direct communication with the unpressurized supply reservoir arranged on the master cylinder side. During the brake slip control action, the auxiliary-pressure system takes necessary pressure fluid volume from the low-pressure accumulator arranged on the return line to the pump and supplies this fluid to the main pressure line. Excess pressure fluid is, at the same time, delivered to a high-pressure accumulator arranged in the branch line to the auxiliary-pressure line and comprising a stepped piston, the extension of this accumulator cooperating with a valve member for the purpose of uncoupling the master cylinder from the connected wheel brake. The anti-lock control will then be effected in the associated wheel brakes in dependence on the electromagnetic actuation of the inlet valves and outlet valves interposed in the main pressure line and the return line, while the master cylinder is isolated from the controlled wheel brakes by the valve member closing the main pressure line.

Due to this structure, this brake system cannot be of compact design and cannot perform a braking pressure control action without the electromagnetic inlet valves necessary in the main pressure lines.

SUMMARY OF THE INVENTION

Therefore, it is an object of the present invention to improve upon a brake system having the aforementioned features to such effect that by minimizing the basic design in respect of circuitry, in particular in respect of the electric control, there is no more need for the electromagnetic inlet valves allocated to the wheel brakes, without having reduced pedal comfort or an impaired operability of the brake system in the event of failure of the auxiliary-pressure supply system.

This object is achieved, according to the present invention, by the arrangement of defined restrictors in the area of the auxiliary-pressure accumulator which establishes a permanent hydraulic connection between the auxiliary-pressure pump, the wheel brake and the electromagnetic outlet valve. Due to the compact arrangement of the hydraulic control paths inside the high-pressure accumulator, the necessary portion of electronics can be minimized without impairing the comfort of operation and the reliability in operation of the system.

In contrast to the previously used method of sealing, in a specific embodiment of the present invention, the stepped piston and its extension are arranged with play in the stepped housing bore, thereby affording a defined fluid volume from the auxiliary-pressure system to the wheel brake as well as to the outlet valve. This permits creating the braking-pressure retaining phase in coaction with the variably pulsable outlet valve without the necessity of an additional electromagnetic controllable pressure-fluid connection between the auxiliary-pressure system and the wheel brake. The pressure-fluid connection, with the fluid flow controlled by a restrictor, can be established constructively by a connecting channel extending thorough the stepped piston and its extension.

To accurately guide the stepped piston in the housing bore and, hence, to preserve the necessary slot dimension between the stepped piston and its extension, respectively, and the housing bore, a specific aspect of the present invention provides for a housing constriction in which the extension is guided.

Further, according to a specific embodiment of the present invention, that portion of the housing accommodating the stepped piston has one pressure fluid port opening in front of the stepped piston and one pressure fluid port opening behind the stepped piston, with each port connected to the auxiliary-pressure pump and with a non-return valve in the port opening behind the stepped piston opening in the direction of the auxiliary-pressure pump. Upon termination of the braking pressure modulation and, hence, also when the auxiliary-pressure pump is not on, the non-return valve, opening in the direction of the auxiliary-pressure pump, permits a quick pressure decrease in the housing portion receiving the stepped piston and a spring which urges the stepped piston to maintain the shut-off valve open.

The operation of an embodiment of an anti-lock brake system, constructed in accordance with the present invention, will be explained in connection with the drawing.

BRIEF DESCRIPTION OF THE DRAWING

The single FIGURE, partially in cross section and partially in schematic form, illustrates a brake system constructed in accordance with the present invention.

DETAILED DESCRIPTION OF THE INVENTION

The brake system shown in the drawing is composed of a braking pressure generator 18 which connects to a shut-off valve 12 via a main pressure line 6. The shut-off valve 12 is within a part of a housing having a stepped bore 10. The housing further accommodates a stepped piston 2 provided with an extension 9. The shut-off valve 12 comprises a valve member 19 which controls the further fluid passage in the main pressure line 6 in the direction of the wheel brake 5 by means of a compression spring. Connections to the other wheel brakes of a multiple-circuit brake system have not been shown in the drawing and will not be described because they would be arranged similar to the one shown in the drawing. In the initial position, the valve member 19 abuts on the extension 9 caused by the effect of the associated spring 16, the extension extending into the opening of the valve seat 20 of the valve member 19. This ensures an unhindered pressure-fluid connection between the braking pressure generator 18 and the wheel brake 5 and permits pressure fluid flow between the braking pressure generator and the wheel brake. The shut-off valve 12 remains in its open condition. Disposed in the end area of the extension 9 is the return line 8 interconnecting the outlet valve 7 and the housing mid-portion 10". The main pressure line 6, connected downstream of the shut-off valve 12, has a permanent hydraulic connection to the return line 8 through a collar 21 formed on the extension 9 and serving as a restrictor 4. Incorporated in the return line 8, in series connection, is an electromagnetic outlet valve 7, which is closed in its initial position, and an auxiliary-pressure pump 1. Disposed between electromagnetic outlet valve 7 and auxiliary-pressure pump 1, in a branch line, is a low-pressure accumulator 22. The pressure side of the auxiliary-pressure pump 1 comprises two pressure fluid ports 14, 15 on the housing portion 10' containing the stepped piston 2. One of these pressure fluid ports 14, 15 terminates into the housing bore 10 in front of the stepped piston 2 and the other of the pressure fluid ports terminates into the housing behind the stepped piston 2. A spring 16, on the front end of the stepped piston 2 remote from the extension 9, determines the piston position when the auxiliary-pressure pump 1 is not activated. A non-return valve 17, opening in the direction of the auxiliary-pressure pump 1, is provided in the line of port 15 which extends through the housing portion 10', accommodating the spring 16. To guide the spring 16, the stepped piston 2 is provided with a coaxial stepped bore which extends over almost the entire length of the extension 9. The end area of the substantially hollow cylindrical extension 9 facing the shut-off valve 12 is shaped as a thrust pin on the collar 21 to actuate the valve member 19. Collar 21 has a plurality of axially extending bores 23 which establish a connection between the first and the second housing portion 10', 10" and the main pressure line 6 leading to the wheel brake 5.

The mode of operation of the brakes system is as follows:

The drawing shows all aforedescribed parts of the brake system in the release position of the brake. This release position is identical with the slip-free normal braking mode, with the exception of the modifications in respect of the wheel cylinder piston and the braking pressure generator piston which are not shown in detail in the drawing. In the release position of the brake, the spring 16, in the auxiliary-pressure accumulator, due to its great rigidity ensures the open position of the shut-off valve 12, thereby permitting an unhindered pressure balance between the wheel brake 5 and the braking pressure generator 18. This results from the greater re-adjusting force of the spring 16, effective in the auxiliary-pressure accumulator, which force acts opposite in relation to the relatively weaker compression spring of the shut-off valve 12. That is to say, in the slip-free normal braking mode, braking pressure can be supplied to the wheel brake 5 via the main pressure line 6 connected to the open shut-off valve 12.

When brake slip signals are sensed by way of the electric brake-slip signal sensing and analyzing unit, which is known in principle and therefore will not be described in detail, the electromagnetic outlet valve 7 will be opened for the purpose of pressure reduction in the wheel brake 5. The restrictor 4, formed by the collar 21 on the extension 9, determines the gradient of pressure reduction. Due to the difference in pressure on the stepped piston 2, dependent on the ratio of end surfaces, a resetting movement of the stepped piston 2 will take place in the sense of relief of the valve member 19. Under the effect of the associated compression spring, the shut-off valve 12 closes the main pressure line 6 connecting the braking pressure generator 18 with the wheel brake 5. The pressure-retaining phase will then be reproduced in dependence on the switching frequency of the outlet valve 7 and of the fluid volume delivered by the auxiliary-pressure pump via the restrictors 3, 4 on the stepped piston 2 and the extension 9. The shut-off valve 12 remains closed because of the end surfaces acting on the stepped piston 2 and, hence, because of the pressure differential, prevents a hydraulic reaction on the braking pressure generator 18. The brake pedal remains unmoved.

The pressure-increase phase during the anti-lock control will occur after closing of the outlet valve 7 in that the auxiliary-pressure pump 1 first supplies the pressure fluid into the annular chamber 26 between the annular end surface of the stepped piston and the housing bore of the auxiliary-pressure accumulator. Due to the dimensioning of the end surfaces, the stepped piston 2 remains in a hydraulically preloaded position in abutment on the fully compressed spring in opposition to the effect of the associated spring 16, while simultaneously the restrictor 3, formed by the radial distance between the peripheral surface of the stepped piston 2 and the housing wall, permits a defined fluid volume flow into the spring chamber 25 and thus subsequently into the longitudinal bore of the extension 9 with the objective of developing a defined pressure increase gradient in the wheel brake 5. After the fluid has passed through the bore 23 arranged in the collar 21, the unhindered hydraulic communication is established to the main pressure line 6 on the wheel brake side. Likewise, a partial fluid flow propagates via the restrictor 4 of the collar 21 up to the outlet valve 7 inserted in the return line 8 and replenishing the low-pressure accumulator 22 at the renewed onset of the pressure decrease phase. The preloaded low-pressure accumulator 22 is discharged as soon as the auxiliary-pressure pump 1 starts its operation.

Upon deactivation of the auxiliary-pressure supply system, the extension 9 moves again into abutment on the valve member 19 under the effect of the spring 16 preloaded on the stepped piston 2. The restrictors 3, 4 provided on the stepped piston 2 and on the collar 21 support the stroke movement of the piston. The shut-off valve 12 is opened by the extension 9, whereby pressure fluid can be supplied manually from the braking pressure generator 18 to the wheel brake 5.

Further advantageous possibilities of the present invention result, for instance, from shifting the restrictors into the area of the end surface of the stepped piston, while the throttles can penetrate the stepped piston substantially in the axial direction. It is likewise possible to design the restrictors as throttle bores which extend substantially radially through the stepped piston and/or the extension. The embodiment claimed herein represents a particularly favorable solution of the problem.

We claim:

1. A hydraulic brake system with anti-lock control, in particular for automotive vehicles, comprising a braking pressure generator, at least one wheel brake, an auxiliary-pressure pump, a pressure accumulator system, as well as comprising at least one outlet valve for controlling the braking pressure and a shut-off valve for isolating the braking pressure generator from the wheel brake, the shut-off valve being inserted into a main pressure line interconnecting the braking pressure generator and the wheel brake, while the outlet valve is inserted into a return line interconnecting the wheel brake and a low-pressure accumulator, wherein the auxiliary-pressure pump takes pressure fluid from the low-pressure accumulator, and wherein a stepped piston guided in a correspondingly stepped housing bore and furnished with an extension cooperates with the shut-off valve such as to enable the extension to govern the pressure-fluid connection between the braking pressure generator and the wheel brake, characterized in that the stepped piston acted upon by the auxiliary-pressure pump accommodates a hydraulic connection which is provided with defined restrictors and which leads to the main pressure line communicating with the wheel brake and to the return line including the outlet valve and in that a permanent hydraulic connection is established, through the restrictors, between the auxiliary-pressure pump, the wheel brake and the outlet valve.

2. A hydraulic brake system with anti-lock control as claimed in claim 1, characterized in that for forming the restrictors the stepped piston and its extension have a defined slot dimension in relation to the stepped housing bore.

3. A hydraulic brake system with anti-lock control as claimed in claim 2, characterized in that the stepped piston and its extension are penetrated substantially axially by at least one pressure-fluid channel so that a hydraulic connection is constituted from a first housing portion acted upon by the auxiliary-pressure pump and accommodating the stepped piston to a second housing portion adjacent to the shut-off valve.

4. A hydraulic brake system with anti-lock control as claimed in claim 3, characterized in that a housing constriction is provided between the first and second housing portions and receives an annular seal abutting on the extension.

5. A hydraulic brake system with anti-lock control as claimed in claim 4, characterized in that the first housing portion accommodating the stepped piston with one pressure fluid port in front of and one behind the stepped piston has each one pressure-fluid connection to the auxiliary-pressure pump, and in that the area of the first housing portion that is under the effect of a spring is provided with a non-return valve inserted into the pressure-fluid port and opening in the direction of the auxiliary-pressure pump.

6. A hydraulic brake system with anti-lock control for automotive vehicles, said system comprising:
 a braking pressure generator;
 a wheel brake;
 a main pressure line connecting said braking pressure generator and said wheel brake;
 a housing defining a stepped bore having:
  (a) a first part, and
  (b) a second part through which said main pressure line extends;
 a shut-off valve in said second part of said bore of said housing for controlling pressure fluid flow between said braking pressure generator and said wheel brake;
 a low-pressure accumulator;
 a return line extending through said housing to said second part of said bore and connecting said wheel brake and said low-pressure accumulator;
 an outlet valve in said return line for controlling pressure fluid flow between said wheel brake and said low-pressure accumulator, said outlet valve:
  (a) being normally closed to prevent pressure fluid flow between said wheel brake and said low-pressure accumulator, and
  (b) adapted to respond to a wheel lock condition to selectively open to permit pressure fluid flow between said wheel brake and said low pressure accumulator;
 an auxiliary-pressure pump adapted to respond to a wheel lock condition for selectively delivering pressure fluid from said low-pressure accumulator to said first part of said bore of said housing; and
 a piston, in said bore of said housing, accommodating a permanent hydraulic connection through restrictors between said auxiliary-pressure pump, said wheel brake and said outlet valve, and movable toward and away from said shut-off valve, for:
  (a) initially engaging said shut-off valve to open said shut-off valve to permit pressure fluid flow through said main pressure line between said braking pressure generator and said wheel brake, and
  (b) disengaging said shut-off valve to close said shut-off valve to prevent pressure fluid flow through said main pressure line between said braking pressure generator and said wheel brake when said piston is acted upon by pressure fluid delivered by said auxiliary-pressure pump into said first part of said bore of said housing.

7. A hydraulic brake system according to claim 6 wherein:
 said piston has:
  (1) a head, and
  (2) an extension extending through said bore:
   (i) initially engaging said shut-off valve to open said shut-off valve to permit pressure fluid flow through said main pressure line between said braking pressure generator and said wheel brake, and
   (ii) disengaged from said shut-off valve to close said shut-off valve to prevent pressure fluid flow through said main pressure line between said braking pressure generator and said wheel brake when said head of said piston is acted upon by said pressure fluid from said low-pressure accumulator delivered by said auxiliary-pressure pump into housing.

8. A hydraulic brake system according to claim 7 wherein:
 (a) said head of said piston is stepped and has opposed end faces of different surface areas and is positioned in said first part of said stepped bore, and
 (b) said extension of said piston is tubular and forms a pressure fluid flow passage between said first and said second parts of said stepped bore.

9. A hydraulic brake system according to claim 8 wherein said housing has:
 (a) a first port through which pressure fluid from said low-pressure accumulator is delivered by said auxiliary-pressure pump into said first part of said stepped bore housing to that end face of said stepped head of said piston having the larger surface area, and
 (b) a second port through which pressure fluid is removed from said first part of said stepped bore from that end face of said stepped head of said piston having the smaller surface area.

10. A hydraulic brake system according to claim 9 wherein said stepped head of said piston forms a restriction to pressure fluid flow within said first part of said stepped bore between said end faces of said stepped head.

11. A hydraulic brake system according to claim 10 wherein said housing defines a recess and the brake system further includes an annular seal:
  (a) fitted in said recess in said bore of said housing,
  (b) through which said extension of said piston extends, and
  (c) which defines said first and said second parts of said bore.

12. A hydraulic brake system according to claim 11 further comprising a spring which urges said extension of said piston into engagement with said shut-off valve to permit pressure fluid flow through said main pressure line between said braking pressure generator and said wheel brake.

13. A hydraulic brake system according to claim 12 further comprising a non-return valve at said second port of said housing and opening in the direction of said auxiliary-pressure pump.

* * * * *